(12) United States Patent
Othily et al.

(10) Patent No.: US 10,185,024 B2
(45) Date of Patent: Jan. 22, 2019

(54) METHOD FOR GEOLOCATING A FLEET OF COMMUNICATING OBJECTS WITHOUT A GPS-TYPE SYSTEM

(71) Applicant: SECOND BRIDGE, Paris (FR)

(72) Inventors: Jérôme Othily, Paris (FR); Karina Cruz Campista, Santo Andre (BR)

(73) Assignee: SECOND BRIDGE, Paris (FR)

( * ) Notice: Subject to any disclaimer, the term of this patent is extended or adjusted under 35 U.S.C. 154(b) by 152 days.

(21) Appl. No.: 15/102,606

(22) PCT Filed: Dec. 8, 2014

(86) PCT No.: PCT/EP2014/076927
§ 371 (c)(1),
(2) Date: Jun. 8, 2016

(87) PCT Pub. No.: WO2015/086538
PCT Pub. Date: Jun. 18, 2015

(65) Prior Publication Data
US 2016/0320470 A1    Nov. 3, 2016

(30) Foreign Application Priority Data

Dec. 9, 2013   (FR) ...................................... 13 62275

(51) Int. Cl.
*G01S 3/02*         (2006.01)
*G01S 5/02*         (2010.01)

(52) U.S. Cl.
CPC ................................. *G01S 5/0289* (2013.01)

(58) Field of Classification Search
CPC ............ G01S 5/0289; G01S 5/14; G01S 11/02
USPC ............... 342/451, 458, 463–465; 455/456.3, 455/456.6
See application file for complete search history.

(56) References Cited

U.S. PATENT DOCUMENTS

2007/0005292 A1   1/2007   Jin
2009/0201850 A1   8/2009   Davis et al.
2013/0045750 A1   2/2013   Kim et al.

FOREIGN PATENT DOCUMENTS

WO        2007/072400 A2    6/2007

*Primary Examiner* — Dao L Phan
(74) *Attorney, Agent, or Firm* — Im IP Law; C. Andrew Im; Chai Im

(57) ABSTRACT

A method for locating communicating objects that make up a fleet. An absolute frame of reference is defined in which the coordinates of the positions of the communicating objects are defined. At least three positions by the coordinates thereof in the absolute frame of reference are defined. The previously defined positions are associated with three communicating objects, referred to as reference objects. A reference object detects the other two reference objects and measures the distance to the two other reference objects. The distance from two reference objects to a fourth communicating object is measured. The geometric location of the distant points from a reference object to the object to be located is the orbit of the reference object. The fourth communicating object is located from at least two orbits previously established and at least one distance among the distances that separate the three reference objects.

26 Claims, 4 Drawing Sheets

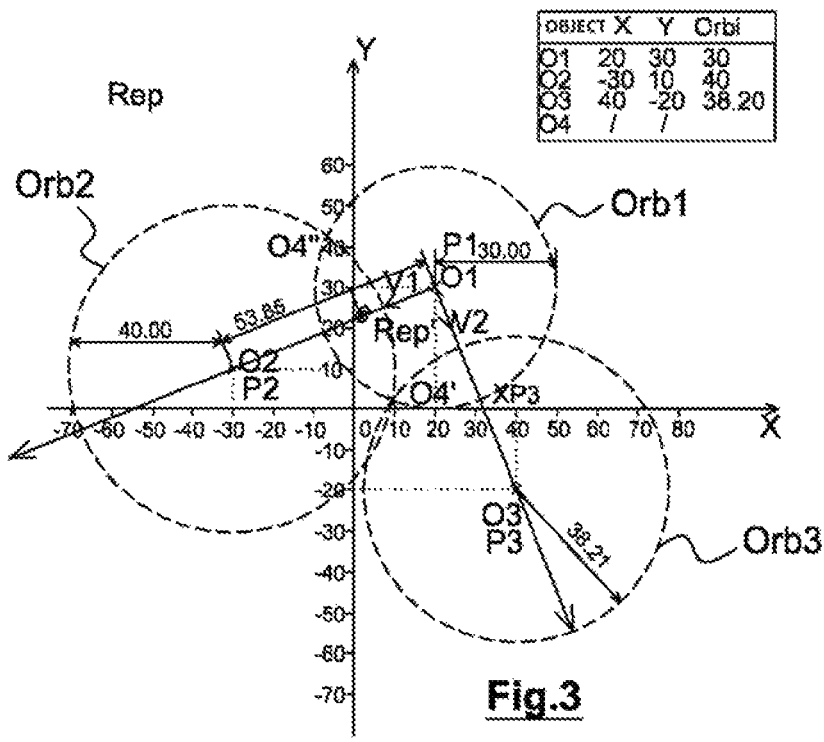

Fig.3

| Step | Status | Action |
|---|---|---|
| E1 | The locations of O1, O2, O3 are known | O4 is located by O1, O2, O3 |
| E2 | The locations of O1, O2, O3, O4 are known | O5 is located bt O2, O3, O4 (O1 is eliminated from the method) |
| E3 | The locations from O1 to O5 are known | O6 is located by O3, O4, O5 (O1 and O2 are eliminated from the method) |
| E4 | The locations from O1 to O6 are known | O7 is located by O4, O5, O6 (O1, O2 and O3 are eliminated from the method) the initialiazion phase is over |

Fig.4

METHOD FOR GEOLOCATING A FLEET OF COMMUNICATING OBJECTS WITHOUT A GPS-TYPE SYSTEM

RELATED APPLICATIONS

This application is a § 371 application from PCT/EP2014/076927 filed Dec. 8, 2014, which claims priority from French Patent Application No. 13 62275 filed Dec. 9, 2013, each of which is incorporated herein by reference in its entirety.

FIELD OF THE INVENTION

The invention relates to a method for geolocating a fleet of communicating objects without using a GPS-type system ('Global Positioning System'). The invention finds a particularly advantageous application in locating men and equipments in a limited, but possibly mobile area. For example, the invention can be used by the members of a task force for locating not only themselves but also relative to each other.

BACKGROUND OF THE INVENTION

It is known that a geolocation can be carried out through a communication between a client device (the object to be located) and a centralized server (the system geolocating the object such as a geostationary satellite). The GPS system works in this manner.

However, in the context of locating men and equipments in a mobile limited area, while data exchanges with the outside are forbidden, a system including a centralized server does not meet the constraints of the previously-mentioned problem.

Furthermore, centralizing the location system involves transmitting a signal according to a star-shaped structure (transmission of a signal between each object to be located and the location server). Such a transmission structure requires to solve problems related to the existence of obstacles that may hinder or prevent the signal transmission between an object to be located and the server.

In addition, the data transmission in a star-shaped structure requires the presence of the server for relaying data between the objects to be located, when each of them requires to know the relative position of their counterparts in the limited area. The location system based on a GPS-type exchange between the client and the server does not meet this need when the context prohibits any exchange with a point outside the limited area containing all the objects to be located.

Traditional GPS-type location systems for example imperfectly allow the location of two points having the same latitude and longitude but having different altitudes, making it difficult to locate two objects having the same coordinates, for example on different floors of a building.

OBJECT AND SUMMARY OF THE INVENTION

The invention aims to effectively solve the drawbacks of existing geolocation systems by proposing a decentralized method for locating objects without data exchange with a point outside the area containing the objects to be located and regardless of the spatial organization of the fleet of points (bi- or three-dimensional).

More specifically, the invention relates to a method for locating a fleet of communicating objects, characterized by comprising the following steps of:

i. defining an absolute reference in which the coordinates of the positions of communicating objects will be defined,
ii. defining at least three positions by their coordinates in the absolute reference system,
iii. associating the above-defined positions with three communicating objects, so-called reference objects,
iv. detecting, through at least one of the reference objects, the other two reference objects,
v. measuring, through at least one of the reference objects, the distance of at least one of the reference objects from the two other reference objects,
vi. measuring the distance of at least two reference objects from a fourth communicating object, the geometric locus of the distant points of a reference object from the object to be located being called orbit of the reference object concerned, and
vii. locating, through at least one communicating object, the fourth communicating object from at least two previously-established orbits and at least one distance among the distances between the three reference objects.

According to one embodiment, when implementing the method for locating the fourth object, only the positions of the reference objects used to locate said object are to be defined, the positions of said reference objects may remain unknown before and/or after the location of the communicating object to be located.

According to one embodiment, at least one communicating object among the three reference objects, so-called locating object, locates the fourth communicating object.

According to one embodiment, the locating object receives, from the other two reference geolocating objects, the distances between the object to be located and each of these two reference geolocating objects.

According to one embodiment, the location is obtained by calculating the intersection of at least two orbits where the object to be located can be placed from the point of view of two of the three reference objects.

According to one embodiment, in the case of a fleet of objects in a plane, an intersection of the orbits of two of the three reference objects comprises two points, the selection of the point corresponding to the position of the object to be located being the point from said two points whose distance from the third reference object is closest to the value of a radius of the orbit of said third object.

According to one embodiment, in the case of a fleet of objects having different altitudes, a geometric locus where the object to be located can be placed from the point of view of two of the three reference objects is a sphere, an intersection of said two spheres is a nappe, the selection of a point in said nappe corresponding to the position of the object to be located being the point among those of the nappe whose distance from the third reference object is closest to the value of a radius of the orbit of said third reference object.

According to one embodiment, the at least two of the three calculated orbits are measured with a relative uncertainty, the method comprises the step of constrained minimization of the difference between the distances of the points in an intersection of at least two orbits from the third reference object and the value of the distance of said points from the third reference object.

According to one embodiment, in the case of a fleet of objects in a plane, one of the methods of constrained minimization consists in calculating an intersection of median circles for each ring forming the potential positions of the object to be located, the radius of the middle circle being defined as a historical average of measured radiuses, exceptional values being dismissed.

According to one embodiment, exceptional values are dismissed by using the following iterative methodology consisting in:
- calculating an absolute average radius from the measurements for estimating the distance from the object to be located,
- dismissing the measures, whose standard deviations are greater than a threshold, by taking into account a weight assigned to each measure according to a signal quality allowing the associated measure, and
- recalculating a relative mean radius on the basis of the remaining values.

According to one embodiment, the method comprises an iterative process for eliminating reference objects used to start a process of dynamic localization of the fleet.

According to one embodiment, the location of a fifth communicating object is performed by the fourth located object and two of the reference objects.

In one embodiment, the location of a sixth communicating object is performed from only one reference object and the fourth and fifth communicating objects whose location is known.

According to one embodiment, the location of the subsequent communication objects is performed by all or some objects whose coordinates are known, and which preferentially belongs to the newly localized objects, different from the reference objects initially used to start the method.

According to one embodiment, the fourth communicating object is located from the measure made by only two reference communicating objects when a potential position of the fourth communicating object is outside a detection zone defined by a maximum detection range for the communicating objects of the fleet.

According to one embodiment, a length of the fleet is greater than the detection range of the communicating objects, a given communicating object exchanges identity data and location data with communicating objects in its immediate environment, the objects in the immediate environment of the given object then relaying said data to all the communicating objects in their immediate environment, and so on until each communicating object of the fleet has knowledge of all the communicating objects of the fleet.

According to one embodiment, the method comprises the step of determining a trajectory of a communicating object of the fleet, from a sampling interval, defined as the time interval between an initial instant and a final instant, during which time is sampled into M instants when the location of the communicating object, whose trajectory is sought, will be calculated.

According to one embodiment, the locating object receives, from objects in its detection zone defined by a maximum detection range, the knowledge of other objects of the fleet and their position, determines among them the objects capable of measuring their distance from the object whose trajectory is to be determined at the sampling instant concerned, and selects at least two reference objects among said objects in order to locate the object to be located at said sampling instant.

According to one embodiment, the choice of at least two reference objects from said objects in order to locate the object to be located at said sampling instant is made under the constraint of a list of objects whose locations are known by the locating object at the sampling instant concerned.

According to one embodiment, a time distribution of the sampling instants is linear in the interval and controls the determination of all the instants.

According to one embodiment, a distribution of the sampling instants is non-linear in all or part of the sampling interval.

According to one embodiment, the non-linear distribution is defined by a predefined rule such as a statistical law.

According to one embodiment, the non-linear distribution is dynamically determined by external conditions such as motion data provided by an accelerometer of the communicating object or a request for establishing a more precise trajectory a sampling sub-interval.

According to one embodiment, the trajectory of the communicating object is obtained according to a method or interpolating positions between the positions determined at each sampling instant.

According to one embodiment, the choice of the interpolation method is established from a calibration method consisting in causing the communicating object to follow a predefined trajectory, then calculating interpolated trajectories by using different interpolation methods, such as linear, polynomial, logarithmic and sine interpolation methods and a combination thereof, and calculating areas delimited by two trajectory curves, namely a predefined trajectory, so-called standard trajectory, and one of the interpolated trajectories, and selecting the interpolation method corresponding to the interpolated trajectory that provides the smallest surface area in the previous calculation.

According to one embodiment, the communicating objects may equally initiate at least detection requests and distance measurement requests and directly transmit this detection and distance information.

According to one embodiment, the communicating objects may be requested, by any communicating object of the fleet, to directly transmit a detection data or a distance measure data.

BRIEF DESCRIPTION OF THE DRAWINGS

The invention will be better understood from the following description and the accompanying figures. These figures are given as an illustration but not a limitation of the invention.

FIG. 3 shows the trilateration leading to the location of the object to be located;

FIG. 4 shows as a diagram the steps of the iterative elimination method for the reference objects used to initiate the dynamic geolocation;

DETAILED DESCRIPTION OF THE EMBODIMENTS

It is described below, with reference to FIGS. 1 to 3, the steps of an initialization phase for the locating method for a communicating object O4 in a fleet F of communicating objects O1-ON, three communicating objects O1-O3 of which are located at known positions when starting the method.

Figure 5:
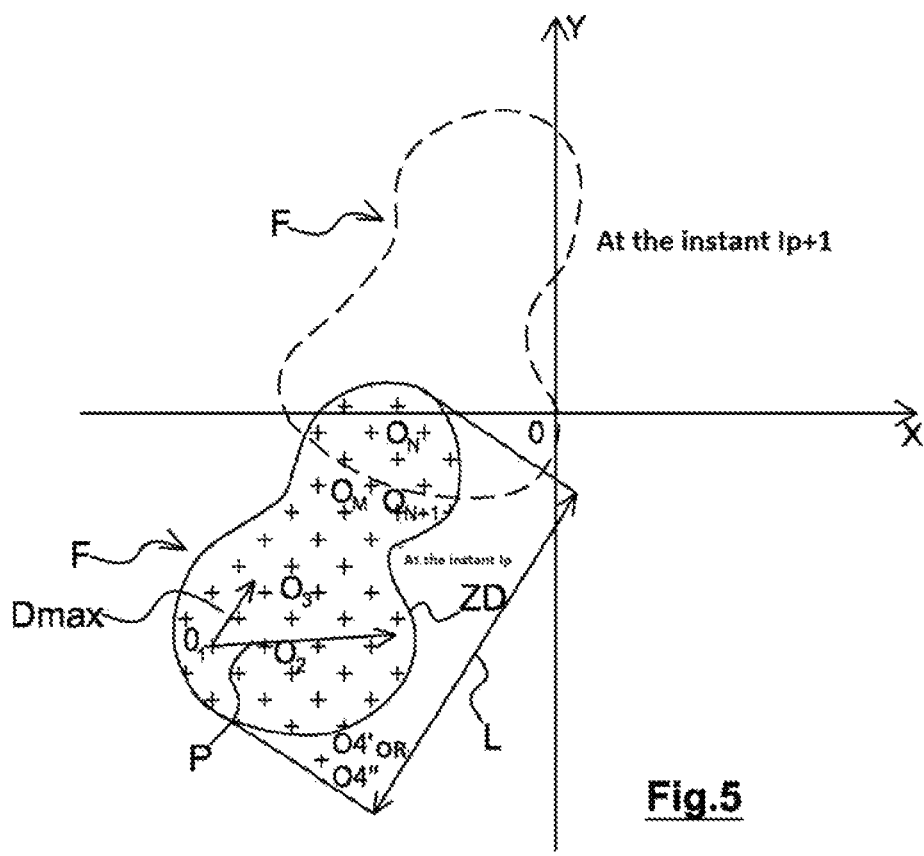
FIG. 5 illustrates the selection method for the reference objects used to iteratively locate an object in a cloud of objects whose size is greater than the maximum detection range for an object.

The communicating objects O1-ON have a maximum detection range P as well as a maximum measurable distance Dmax from another object (see FIG. 5). The expression "maximum detection range" means the greatest distance between two objects able to detect each other. The expression "maximum measurable distance Dmax between two objects" means the greatest distance between two objects able to measure this distance. These two characteristics (maximum detection range P and maximum measurable distance Dmax from another object) may be the same or different for the same object Oi. These characteristics may also vary from one object of the fleet F to another.

Figure 1:
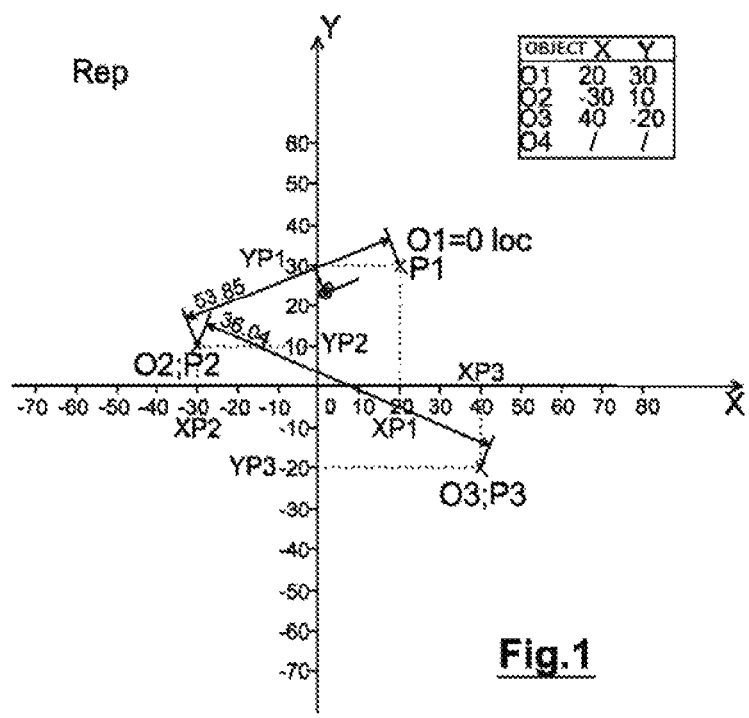
FIG. 1 is a representation of the fixed positions where the reference communicating objects are located.
Figure 2:
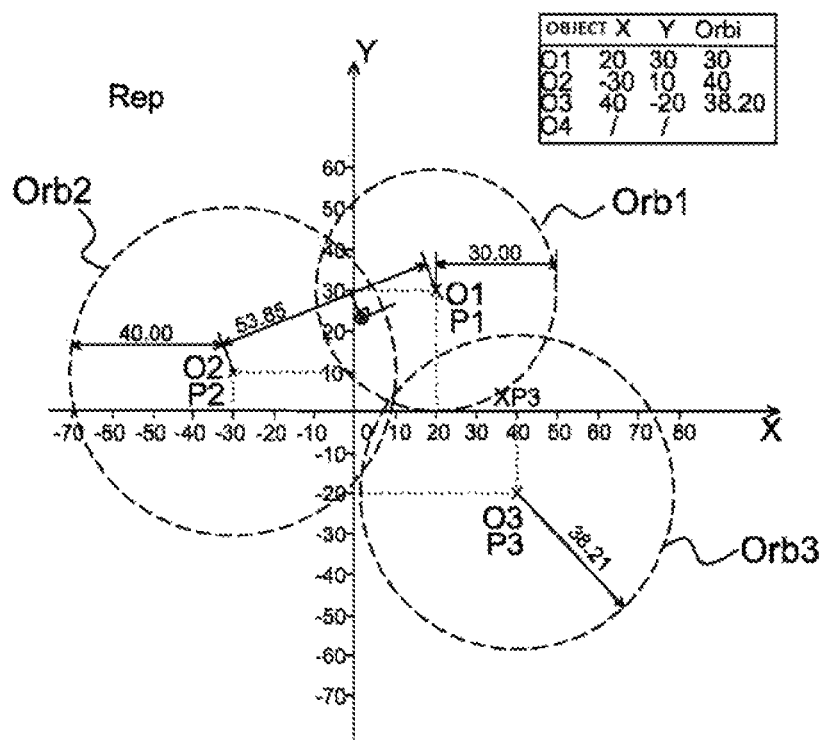
FIG. 2 shows the probabilities of presence of the communicating object to be located when implementing the method according to the present invention.

Specifically, as shown in FIG. 1, an absolute reference system Rep(O, X, Y) is chosen at first in which all the positions of the objects to be located will be calculated. The coordinate system associated with this reference system is a Cartesian one in our example. Alternatively, this coordinate system may be cylindrical, elliptical, or of any other nature.

The method is based on the initial knowledge either of the map location of three communicating objects, so-called reference objects O1, O2, O3, when calculating the geolocation of the communicating object O4, or the data of coordinates O1, O2, O3 in the selected reference system. For example, the following two processes are eligible initialization process: as part of a first process, it is indicated to the objects O1, O2, O3 the instant when they are correctly positioned on a map at an easily recognizable point such as a gateway, or a monument (the coordinates of the objects O1, O2, O3 are not explicitly known in this case). In the context of a second process, the coordinates in the chosen reference system of the objects O1, O2, O3 are directly placed therein.

Thus, as shown in FIG. 1, three positions P1, P2, P3 are defined by their coordinates (XP1, YP1; XP2, YP2; XP3, YP3) in the absolute coordinate system Rep(O, X, Y.). The table in FIG. 1 thus shows the coordinates of the three reference objects O1-O3. The object O1 is positioned at position P1, the object O2 at position P2, the object O3 at position P3. However, this step is unnecessary if the initialization process is the first process above.

The reference objects O1, O2 and O3 detect each other, i.e. the object O1 detects the objects O2 and O3, the object O2 detects the object O1 and O3; the object O3 detects the objects O1 and O2. Alternatively, it is also possible that only one or two of the objects O1-O3 detect two or only one of the other communicating objects. At least one of the communicating objects, so-called locating object Oloc to which the other objects transmit measured values, comprises the devices necessary for the distance calculation and measurement function in order to locate another object individually. The locating object Oloc could be for example the object O1.

The objects O1, O2 and O3 measure the distance between them and each other communicating object, i.e. the object O1 estimates the distance between O1 and O2 and between O1 and O3, the object O2 estimates the distance between O2 and O1 and between O2 and O3, and the object O3 estimates the distance between O3 and O1 and between O3 and O2. These distances are transmitted to the locating object Oloc=O1. Alternatively, it is also possible that only one or two of the objects O1-O3 evaluates the distance from two or only one of the other communication objects.

The objects O1, O2 and O3 measure the distance between them and a fourth communicating object O4 to be located (distance O4-O2, distance O4-O1 and distance O4-O3). FIG. 2 thus illustrates the three orbits Orb1, Orb2, Orb3 of the possible positions of the communicating object O4. Each orbit ORB1, Orb2, Orb3 corresponds to all the equidistant geometrical positions of the object O4 to be located relative to the reference object O1, O2 or O3 considered.

These orbits Orb1, Orb2, Orb3 of the three reference objects O1-O3 have a circular shape if the fleet F of the communicating objects O1-O3 have a flat configuration, i.e. the communicating objects of the fleet F are located at the same altitude, or on a sphere if the fleet F has a non-flat configuration, i.e. the communicating objects of the fleet F are located at different altitudes.

It is also possible that only one or two objects estimate the distance from both or only one of the other communication objects. For example, in the context of the geolocation of an object at the periphery of a fleet F of communicating objects O1-ON, the use of the distance from the third reference object O3 may not be necessary particularly in case one of the potential positions of the object O4 to be located would locate the object to be located at a distance greater than the detection range P as explained in more details below.

Then, the fourth communicating object O4 is located, i.e. its coordinates are provided, in the absolute coordinate from all or part of the predetermined orbits Orb1, Orb2, Orb3.

FIG. 3 shows the relative reference system Rep' and shows the two possible positions of O4: O4' and O4". They correspond to the intersection of Orb1 and Orb2 which are the geometric locus of potential positions of O4 relative to O1 and O2.

The coordinates of O4' and O4" are expressed in a relative reference system Rep' comprising (O1, V1, V2), wherein V1 is the unit vector along the straight line O1O2 and V2 is the unit vector normal to V1. These coordinates $(X_{O4'}^{rep'}, Y_{O4'}^{rep'})$ and $(X_{O4''}^{rep'}, Y_{O4''}^{rep'})$ are determined from the following relationships:

$$X_{O4'}^{Rep'} = \frac{O_1 O_2^2 - (O_2 O_4^2 - O_1 O_4^2)}{2 O_1 O_2^2}$$

$$Y_{O4'}^{Rep'} = +\sqrt{O_1 O_2^2 - X_{O4'}^{Rep'}}$$

$$Y_{O4'}^{Rep'} = \sqrt{O_1 O_2^2 - X_{O4'}^{Rep'}}$$

These formulas eliminate among all the possible positions represented by the orbits Orb1 and Orb2 except two:

$$P'_4 = (X_{O4'}^{Rep'}, Y_{O4'}^{Rep'})$$

and $$P''_4 = (X_{O4''}^{Rep'}, Y_{O4''}^{Rep'})$$

The method then consists in eliminating one of the positions P4' or P4" by removing one of the two the distance of which from O3 is the furthest value from the radius of the orbit Orb3.

The coordinates of O4 in the absolute reference system Rep are derived from its coordinates in the reference system Rep' by a traditional formula of change of reference.

The result is associated with a measurement uncertainty which is mainly due to the measurement accuracy of the distances $O_1O_2$, $O_1O_4$, $O_2O_4$. According to the desired accuracy of the geolocation of the object O4, the aforementioned location method can be improved as follows.

The uncertainty of the measurement of the distance $O_1O_2$, $O_1O_4$, $O_2O_4$ results in a geometric locus of the potential positions of O4 which has the shape of a ring and not of a circle, in a flat configuration, or the shape of a spherical cap and not of a sphere, in the case of the configuration of a fleet F composed of points at different altitudes.

Consequently, the intersection of geometric loci of the potential positions of the object O4 to be located has the shape of a flat surface instead of two points, in a flat configuration, or the shape of a spherical cap instead of a nappe in a non-flat configuration.

In order to identify the actual position of the object O4 to be located, from all the possible positions, i.e. the positions at the predetermined distance $O_4O_2$, $O_4O_1$ relative to said two objects O1, O2 among the three predetermined reference objects O1, O2, O3, are dismissed those the distance of which from the object 04 presents, relative to the distance of the object 04 from said third reference object O3, a difference greater than a predetermined threshold.

One of the methods of constrained minimization thus consists in calculating the intersection of the median circles of each ring forming the potential positions of the object O4, the radius of the middle circle being defined as the historical average of the measured radii, after dismissing exceptional values.

The exceptional values are dismissed according to the following iterative methodology. An absolute average radius is calculated from the measurements for estimating the distance from the object O4. By taking into account the weight assigned to each measure according to the signal quality allowing the measure associated, the measures whose standard deviations are greater than a threshold, are dismissed and a relative average radius is recalculated from the remaining values. This threshold is an empirical value adjusted according to the historical performances of the method and the external conditions of use of the device, and the expected accuracy. For example, a threshold of 30% is selected.

FIG. 4 illustrates the implementation of the method for doing without the three reference objects O1-O3 and ensuring the iterative location of all the devices in the fleet F from other reference objects the definition of which will vary over time.

More specifically, in a first step E1, a fourth object $O_4$ is located from three communicating objects O1-O3 whose location is known at the time of using the method.

In a second step E2, a fifth object 05 is located from two reference objects O2 and O3 and the fourth object O4 whose locations are known at the time of implementation of the process. A first initial reference object is thus eliminated, for example object O1.

In a third step E3, a sixth object O6 is located from only one reference object O3 and fourth 04 and fifth 5 communicating objects whose locations are known at the time of implementation of the method. Two initial reference objects, such as objects O1 and O2, are thus eliminated.

In a fourth step E4, a seventh communicating object O7 is located from the fourth O4, fifth O5 and sixth O6 communicating objects whose locations are known at the time of implementation of the method. The three initial reference objects O1-O3 of the method are thus eliminated.

It should be noted that the location of each object Oi is performed from three reference communicating objects (which may be the initial reference objects at the beginning of the method or other objects after their elimination) whose position needs to be known only at the time of the location of the object Oi. It is thus induced that only the positions at the time of using the location method for the object Oi, objects used to locate the object Oi, must then be defined in the method. In particular, the positions of the objects, used for locating the object Oi before and/or after the time of locating the communicating object Oi, may be unknown, for example because of a mobility of the objects. This will not disturb the implementation of the method.

Furthermore, as illustrated in FIG. 5, the length L of the fleet F, defined by the distance between the two communicating objects O1-ON, which are the farthest objects of the fleet F from one another, can be much greater than the detection range of the communicating objects. The method allows all the objects to know the existence, the position, and if necessary the direction of all the other communicating objects of the fleet F, even those distant by a distance greater than the maximum detection range of the communicating objects O1-ON through the following iterative communication method.

An object Oi exchanges identity data and location data with communicating objects in its immediate environment. The immediate environment is defined by the communicating objects distant from the object Oi by a distance inferior to the maximum detection range P and/or a distance inferior to the measurable maximum distance Dmax and/or the communicating objects in direct line with Oi, i.e. the communicating objects that are not separated from the object Oi by an obstacle that may interfere with the communication between two communicating objects. The objects in the immediate environment of the object Oi then relay these data to all communicating objects in their immediate environment and so on until each communicating object O1-ON of the fleet F has knowledge of all the communicating objects of the fleet F, including those which do not fall within its detection perimeter defined by the range P.

Furthermore, as the ability to measure the distance between two communicating objects is limited by technical means (maximum detection range P), there are configurations of fleets F in which one of the two potential positions O4' and O4", defined as the two intersections of Orb1 and Orb2, is located outside of the detection area ZD defined by the maximum detection range P of the communicating objects of the entire fleet. In this case, O4 can be located from the distance measurement, relative to O4, of two communicating objects having only known positions. This is due to the adhesion phenomenon of one of the objects relative to the fleet F of objects.

Moreover, in order to locate a fleet F composed of N communicating objects, for a fleet F whose length L is greater than the maximum detection distance Dmax (FIG. 5), the choice of the locating object Oloc as well as the object or objects whose coordinates are already known and used to locate a fourth object in the fleet F, is made by a successive iteration in the fleet F. This iteration is controlled by the measurable maximum distance Dmax of an object of the fleet F from another object of the fleet F.

More specifically, the choice of the fourth object to be located by the first three objects (the three reference objects) is made exclusively from points distant at the most by the measurable maximum distance Dmax from the first three objects. In this way, in case a fleet has a length L greater than the measurable maximum distance Dmax, all the points outside the detection zone ZD are excluded. The choice of the fourth object O4 is also made with the constraint of propagating the location information towards the most distant points of the fleet F.

Preferably, the communicating objects O1-ON can may equally initiate at least detection requests and distance measurement requests and directly transmit this detection and distance information. In particular, they can transit this information without using any means of communication, such as servers, proxies or satellites or other platform whose principal or secondary purpose is to federate or relay this detection and distance information.

The communicating objects O1-ON may be equally requested by any object O1-ON of the fleet F for directly transmitting a given detection or distance measurement data. In particular, the objects have the same status in the settlement agreement, i.e. they can be either a server or a client regardless of the type of information relayed and especially those of detection and distance.

Figure 6A:
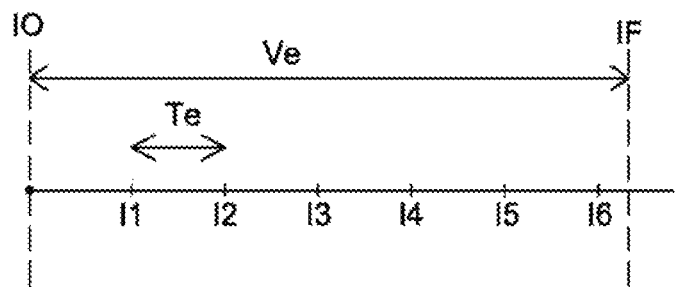
FIGS. 6a and 6b show two different distribution methods for sampling instants.
Figure 6B:
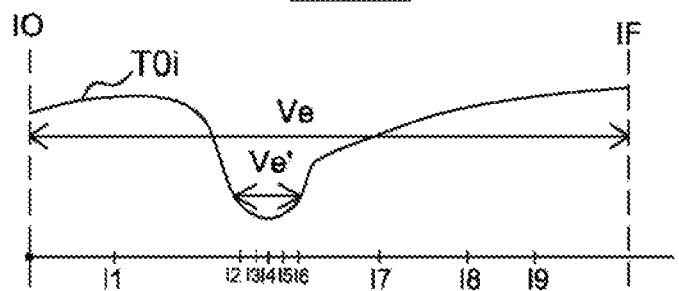
Figure 7:
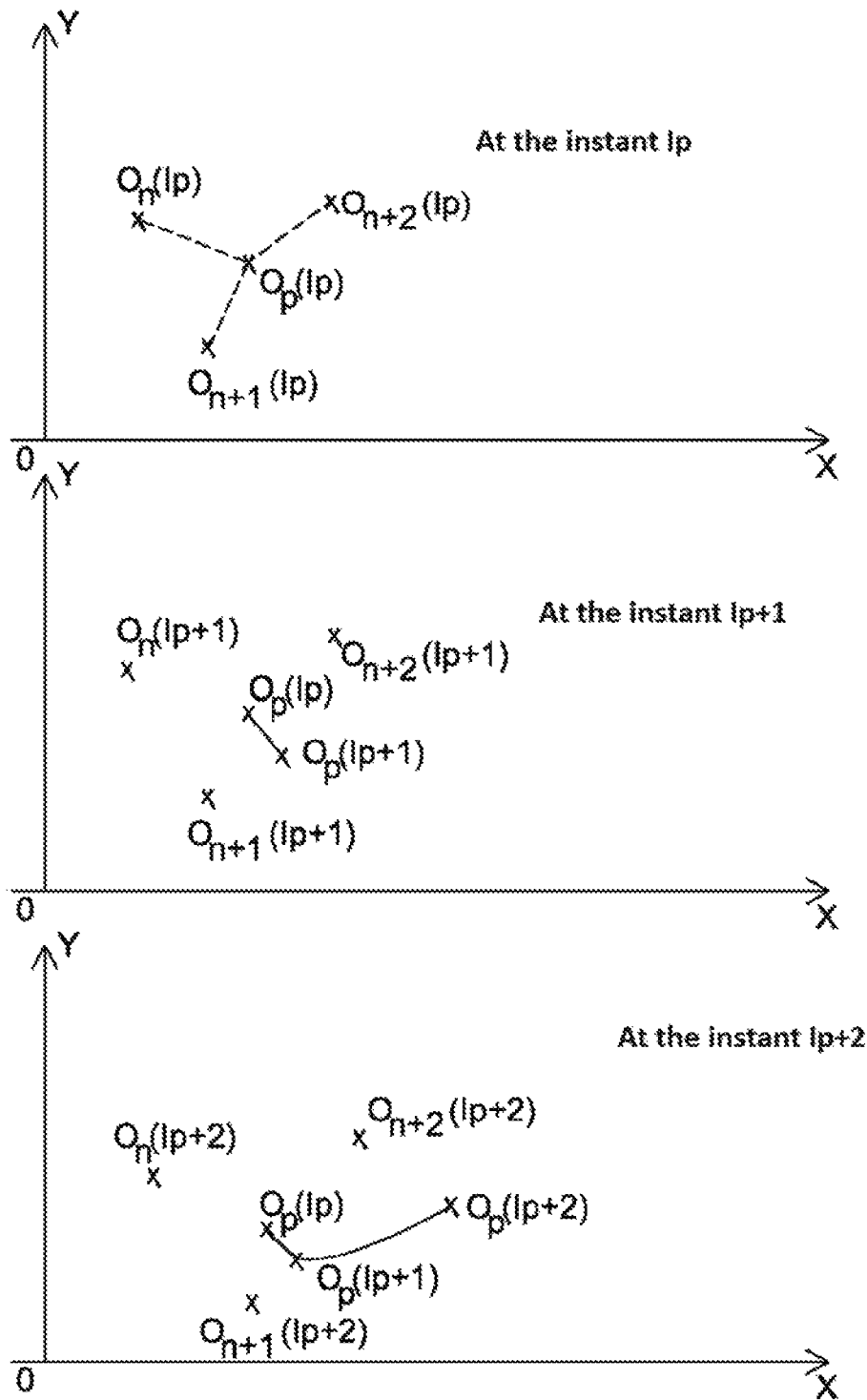
FIG. 7 illustrates the iterative method for determining the trajectories of each object to be located a mobile limited area.

Thereafter, it is described, with reference to FIGS. 6 and 7, the method of determining a trajectory of a communicating object O1-ON of the fleet F.

To this end, a sampling interval Ve is defined as the time interval between an initial instant IO and a final instant IF, during which time is sampled into a set of m instants Ii when the location of the communicating object, whose trajectory is sought, will be calculated.

The distribution of instants Ii may be linear within Ve as shown in FIG. 6a, in this case there is a fixed sampling period Te controlling the determination of the instants Ii.

However, the distribution of instants Ii may be non-linear and is either defined according to a preset rule such as a Gaussian-type statistical distribution law, or dynamically determined by an external request such as the interpretation of movement data provided by an accelerometer, requiring a concentration of instants Ii in a sub-interval Ve' included in the interval Ve as shown in FIG. 6b. For example, for a trajectory TOi of an object Oi, the detection of a sudden change in direction generates a request for location information in the sub-interval Ve'.

The locating object Oloc receives from objects in the detection area the knowledge of the other objects of the fleet F and the position of those already located at this instant of the iteration. The locating object Oloc determines among these objects those which are capable of measuring their distance from the object Oi whose trajectory is to be determined at the sampling instant concerned. The locating object Oloc chooses at least two reference objects from these objects to locate the object to be located Oi, at this sampling instant, under the constrain of the list of objects whose locations are known by the locating object Oloc at the sampling instant concerned.

FIG. 7 illustrates the interpolation of the positions between the positions determined by the previous location for an object Op at three successive instants Ip, Ip+1 and Ip+2. The positions of the object Op are determined by using the three reference objects On, On+1, On+2 which do not necessarily correspond to the initial reference objects O1-O3. For a better understanding, the three objects shown in the figures are identical at the three instants Ip, Ip+1, Ip+2. However, in practice, the three reference objects used for locating the object Op at the successive instants Ip, Ip+1, Ip+2 may be different from one instant to the next.

At instant Ip, the reference objects On(Ip), On(Ip+1), On(Ip+2) locate the object Op(Ip).

At instant Ip+1, the reference objects On(Ip+1), On+1(Ip+1), On+2(Ip+2) locate the object Op(Ip+1).

An object of the fleet F, which can be one of the reference objects On, On+1, On+2, or the object to be located itself or another object of the fleet F, calculates, in the simplest case, the single right line segment passing through the two points Op(Ip), Op(Ip+1) or, in the more elaborate case, the polynomial of degree M passing through Op(Ip) and Op(Ip+1) and meeting constraints of continuity and possibly derivabilities, imposed by Op(Ip) and Op(Ip+2). In the latter case, the interpolation of the segments [Op(Ip), Op(Ip+1] is carried out a posteriori after the locations of the positions of Op at each of the m instants Ip.

At the instant Ip+2, the reference objects On(Ip+2), On+1(Ip+2), On+2(Ip+2) locate the object Op(Ip+2). A similar interpolation to the one described above is carried out between the points Op(Ip+1) and Op(Ip+2) or the interpolation of the trajectory is carried out a posteriori on the three points Op(Ip), Op(Ip+1) and Op(Ip+2) in order to determine the interpolated trajectory of the object Op.

The choice of the interpolation method will be made particularly on the basis of a calibration method of this trajectory determination method. This calibration method consists in optimizing the choice of the interpolation method according to the following method. At first, the communicating object is caused to follow a predefined trajectory. Then interpolated trajectories are calculated by different interpolation methods including a linear, polynomial, logarithmic, sine interpolation method and a combination thereof. The areas defined by the two curves, namely the predefined trajectory, so-called standard trajectory, and one of the interpolated trajectories. The optimization consists in selecting the interpolation method corresponding to the interpolated trajectory that provides the smallest surface area in the previous calculation.

Of course, the above description has been given as an example only and does not limit the scope of the invention the limits of which are not exceeded when replacing the details of execution by any other equivalents.

The invention claimed is:

1. Method of locating communicating objects forming a fleet, comprising the steps of:
   defining an absolute reference system in which coordinates of positions of the communicating objects are defined;
   defining at least three positions by their coordinates in the absolute reference system;
   associating said at least three positions with three communicating objects, referred to as three reference objects;
   detecting, through at least one of the reference objects, other two reference objects;
   measuring, through said at least one of the reference objects, a distance of said at least one of the reference objects from said other two other reference objects;
   measuring a distance of at least two reference objects from a fourth communicating object, a geometric locus of distant points of a reference object from the fourth communication object is an orbit of the reference object;
   locating, through said at least one reference object, the fourth communicating object from at least two previously-established orbits and at least one distance among the distances between the three reference objects; and
   wherein a length of the fleet is greater than a detection range of the communicating objects, a given communicating object exchanges identity data and location data with communicating objects in an immediate environment of said given communicating object, each communicating object in the immediate environment of said given communicating object relays said identity and location data to all communicating objects in an immediate environment of said each communicating object until each communicating object of the fleet has knowledge of all other communicating objects of the fleet.

2. The method according to claim 1, wherein the step of locating the fourth communicating object defines only positions of reference objects used to locate the fourth object, the positions of the three reference objects remain unknown before or after the location of the fourth communicating object.

3. The method according to claim 1, wherein at least one communicating object among the three reference objects is a locating object, the locating object locates the fourth communicating object.

4. The method according to claim 3, wherein the locating object receives, from the other two reference objects, the distances between the fourth communicating object and each of the other two reference objects.

5. The method according to claim 1, wherein a location of the fourth communicating object is obtained by calculating an intersection of at least two orbits where the fourth communicating object are placeable from a point of view of two of the three reference objects.

6. The method according to claim 5, wherein the communicating objects of the fleet is in a plane; wherein an intersection of the orbits of a first reference object and a second reference object comprises two points; and further comprising the step of selecting a point corresponding to the position of the fourth communicating object from said two points whose distance from a third reference object is closest to a value of a radius of the orbit of the third reference object.

7. The method according to claim 5, wherein each communicating object of the fleet has a different altitude; wherein a geometric locus of a placement of the fourth communicating object from the point of view of a first reference object and a second reference object is a sphere; wherein an intersection of two spheres is a nappe; and further comprising the step of selecting a point in the nappe corresponding to the position of the fourth communicating object from points the nappe whose distance from a third reference object is closest to a value of a radius of the orbit of the third reference object.

8. The method according to claim 5, wherein at least two of the three orbits are measured with uncertainty; and further comprising the step of constrained minimization of a difference between distances of points in an intersection of at least two orbits from a third reference object and a value of the distance of said points from the third reference object.

9. The method according to claim 8, wherein the communicating objects of the fleet is in a plane, wherein the step of constrained minimization comprises the step of calculating an intersection of median circles for each ring forming potential positions of the fourth communicating object, a radius of a middle circle is defined as a historical average of measured radii.

10. The method according claim 9, further comprising the step of dismissing an exceptional measurement in determining the historical average of measured radii by:

calculating an absolute average radius from measurements for estimating the distance from the fourth communicating object;

dismissing a measurement whose standard deviation is greater than a predetermined threshold, by considering a weight assigned to each measurement according to a signal quality of the said each measurement; and recalculating a relative mean radius based on the remaining measurements.

11. The method according to claim 1, further comprising the iterative step of eliminating the reference objects used to start a process of dynamic localization of the fleet.

12. The method according to claim 11, further comprising the step of locating a fifth communicating object based on the fourth communicating object and two reference objects.

13. The method of claim 12, further comprising the step of locating a sixth communicating object from only one reference object, the fourth communication object and the fifth communicating objects.

14. The method according to claim 13, further comprising the step of locating a subsequent communication object by all or a set of communicating objects whose coordinates are known and said all or set of communication objects do not include the reference objects.

15. The method according to claim 1, further comprising the step of locating the fourth communicating object from a measurement based on only two reference objects in response a determination that a potential position of the fourth communicating object is outside a detection zone, the detection zone is defined by a maximum detection range for the communicating objects of the fleet.

16. The method according to claim 1, further comprising the step of determining a trajectory of a communicating object of the fleet sampled at M sampling instants during a sampling interval when the location of the communicating object is calculated, the sampling interval is defined as a time interval between an initial sampling instant and a final sampling instant.

17. The method according to claim 16, wherein at least one communicating object among the three reference objects is a locating object, the locating object locates the fourth communicating object; wherein the locating object receives from communicating objects in its detection zone information about other communicating objects of the fleet and their positions to provide known communicating objects, the detection zone is defined by a maximum detection range of the locating object; wherein the locating object determines communicating objects capable of measuring their distance from the communicating object whose trajectory is to be determined at a sampling instant, and selects at least two reference objects from the known communicating objects to locate the communicating object whose location is to be determined at the sampling instant.

18. The method according to claim 17, wherein the selection of said at least two reference objects from said known communicating objects to locate the communicating object whose location is to be determined at the sampling instant, is made under a constraint of a list of communicating objects whose locations are known by the locating object at the sampling instant.

19. The method according to claim 16, wherein a time distribution of the sampling instants is linear in the sampling interval and the time distribution controls determination of the M sampling instants.

20. The method according to claim 16, wherein a distribution of the M sampling instants is non-linear in all or part of the sampling interval.

21. The method according to claim 20, wherein the non-linear distribution is defined according to a predefined rule.

22. The method according to claim 20, wherein the non-linear distribution is dynamically determined by external conditions, the external conditions are motion data provided by an accelerometer of the communicating object or a request to establish a trajectory during a sampling sub-interval.

23. The method according to claim 16, wherein the trajectory of the communicating object is obtained by interpolating positions between locations determined at each sampling instant.

24. The method according to claim 23, wherein the positions are interpolated so that the communicating object follows a predefined trajectory; and further comprising the steps of interpolating trajectories using at least one of linear, polynomial, logarithmic and sine interpolation methods; calculating surface areas delimited by two trajectory curves, a predefined or standard trajectory and an interpolated trajectory, and selecting an interpolation method for a corresponding interpolated trajectory that provides a smallest surface area.

25. The method according to claim 1, further comprising the step of initiating at least detection requests and distance measurement requests and directly transmitting detection data and distance measurement data.

26. The method according to claim 1, further comprising the step requesting the communication objects of the fleet to directly transmit a detection data or a distance measurement data to a requesting communicating object.

* * * * *